United States Patent [19]
Gade

[11] 3,776,405
[45] Dec. 4, 1973

[54] APPARATUS FOR UNLOADING CARTRIDGES FROM TRAYS

[75] Inventor: John N. Gade, Rush, N.Y.

[73] Assignee: Eastman Kodak Company, Rochester, N.Y.

[22] Filed: Jan. 24, 1972

[21] Appl. No.: 220,027

[52] U.S. Cl................... 214/310, 198/24, 198/221
[51] Int. Cl.......................................... B65b 35/20
[58] Field of Search................. 214/310, 8.5 F, 654; 198/24, 221; 29/208 E

[56] References Cited
UNITED STATES PATENTS

| | | | |
|---|---|---|---|
| 3,625,384 | 12/1971 | Boerger | 214/310 |
| 2,856,089 | 10/1958 | Lennon | 214/310 |
| 2,386,076 | 10/1945 | Taylor et al. | 214/310 |
| 3,528,576 | 9/1970 | Runyan et al. | 214/310 |
| 3,590,975 | 6/1971 | Hollenton | 198/33 AD |

FOREIGN PATENTS OR APPLICATIONS

| | | | |
|---|---|---|---|
| 1,810,090 | 10/1969 | Germany | 214/310 |

Primary Examiner—Gerald M. Forlenza
Assistant Examiner—Lawrence J. Oresky
Attorney—William T. French et al.

[57] ABSTRACT

A method and apparatus for unloading cartridges from a tray, and particularly suitable for use in a cartridge handling system in which the unloaded cartridges are fed to a spooling machine where they are loaded with film. The cartridge handling system comprises an in-feed section for unloading rows of empty cartridges from the tray and feeding the cartridges one at a time into the spooling machine, and an out-feed section for removing the loaded cartridges one at a time from the spooling machine, arranging the cartridges into rows, and loading the rows of cartridges into empty trays. The tray unloading apparatus comprises an elevator mechanism for lifting the empty cartridges from a tray to an elevated position clear of the tray, and a retaining mechanism for retaining the cartridges in proper orientation on the elevator mechanism during the lifting operation. In addition a cartridge sweeping mechanism sweeps the rows of cartridges lifted from the tray to a transfer-conveying system which converts the rows of cartridges into a single row and feeds them in single file order to the spooling machine.

11 Claims, 6 Drawing Figures

APPARATUS FOR UNLOADING CARTRIDGES FROM TRAYS

BACKGROUND OF THE INVENTION

1. Field of the Invention

This invention relates generally to article handling systems, and more specifically to a method and apparatus for unloading cartridges from a tray for subsequent feeding to a work station such as a spooling machine.

2. Description of the Prior Art

Article handling systems for feeding articles to a work station where a finishing operation is performed on the article, and then transporting the finished article to a loading station are generally well known in the art. In many of such systems, transfer-conveyor mechanisms are used for converting multiple rows of articles into a single row, and a single row of articles into multiple rows. It is also known to feed articles in single file order to an accumulator which accumulates a row of the articles, and then transfers the accumulated row in a direction substantially at right angles to the single line. Many of such article handling systems also employ transfer or pusher mechanisms for changing the direction of movement of an article. It is further known to provide an elevator mechanism in such article handling systems comprising elevator bars adapted to pass through elongated openings in the bottom of a tray for lifting articles in the tray in an elevated position clear of the tray for transfer to another station. Although the aforementioned elevator mechanism may satisfactorily achieve a specific objective such as loading or unloading relatively heavy articles such as bottles, cans or the like into or from boxes or trays, it is unsatisfactory for lifting light, non-uniformly shaped articles such as cartridges of substantially U-shaped configuration, which are unstable on the bars, tending to skew or tilt, particularly if the center of gravity of each cartridge is offset from the center of the cartridge, and the cartridge is not properly centered on the bars. The tilted cartridges may not line up properly with receiving equipment onto which the cartridges are swept, and hence machine jamming and breaking of the cartridges may result when the sweeping mechanism attempts to transfer the cartridges onto the receiving equipment. Applicant's improved tray unloading mechanism is believed to obviate this and other disadvantages of prior art unloading mechanisms.

SUMMARY OF THE INVENTION

This invention includes within its scope a method and apparatus for unloading articles such as empty cartridges from a tray, and sweeping the unloaded cartridges onto a transfer-conveyor system for feeding the cartridges one at a time into a spooling machine where the cartridges are loaded. The single row of loaded cartridges from the spooling machine are converted by a similar transfer-conveyor system into multiple rows and loaded into empty trays. The tray unloading apparatus for practicing the method of this invention comprises an elevator mechanism for lifting rows of empty cartridges from a supply tray, a cartridge retaining mechanism for retaining the cartridges in proper orientation on the elevator mechanism during the lifting operation, and a sweeping mechanism for sweeping the unloaded cartridges onto a cartridge receiving mechanism.

More specifically, in a preferred embodiment of the invention, the elevator mechanism of the tray unloading apparatus comprises a plurality of parallel, spaced, elongated elevator bars movable by any suitable power means such as a fluid cylinder between a normal retracted position and an elevated position. The elevator bars are arranged in alignment with elongated openings in the bottom of a compartmented tray containing rows of empty cartridges. As the elevator bars are moved by the power means to the elevated position, they enter the inverted U-shaped recesses in the rows of cartridges and engage and lift the cartridges out of the tray. To prevent the cartridges from tilting on the bars during the lifting operation, and hence possibly jamming the sweeping mechanism and breaking cartridges, a plurality of floating retaining bars of the cartridge retaining mechanism arranged in alignment with the elevator bars descend into close proximity to the cartridges prior to movement of the elevator bars to an elevated position. Accordingly, as the elevator bars are raised, they initially engage the cartridges and force the cartridges into engagement with the retaining bars which hold or retain the cartridges on the elevator bars upon continued movement of the bars to the elevated position. At the elevated position, the retaining bars are withdrawn from engagement with the cartridges, and releasably locked to the sweeping mechanism. The sweeping mechanism is moved by any suitable power means in a horizontal plane causing a sweep bar to sweep the cartridges from the elevator bars onto aligned inverted T-bars or the like of the cartridge receiving mechanism. The elevator bars and sweeping mechanism are then returned to their normal rest positions in readiness for another cycle of operation.

It is accordingly one of the objects of the present invention to provide a method and apparatus for unloading articles such as empty cartridges from a tray without jamming the apparatus or breaking cartridges.

Another object of the invention is to provide an apparatus for unloading cartridges from a tray in which detrimental canting, skewing or tilting of the cartridges as they are lifted from the tray is eliminated.

Another object of the invention is to provide a method and apparatus for unloading empty cartridges from a tray in which manual handling of the cartridges is eliminated.

Another object of the invention is to provide an apparatus for unloading cartridges from a tray that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because article handling systems are well known, the present description will be directed in particular to elements forming part of, or cooperating more directly with, the present invention. Article handling equipment such as conveyors, transfer systems, power systems, and logic control systems, portions of which are shown or described herein, should be understood to be selectable from those known in the art.

Figure 1:
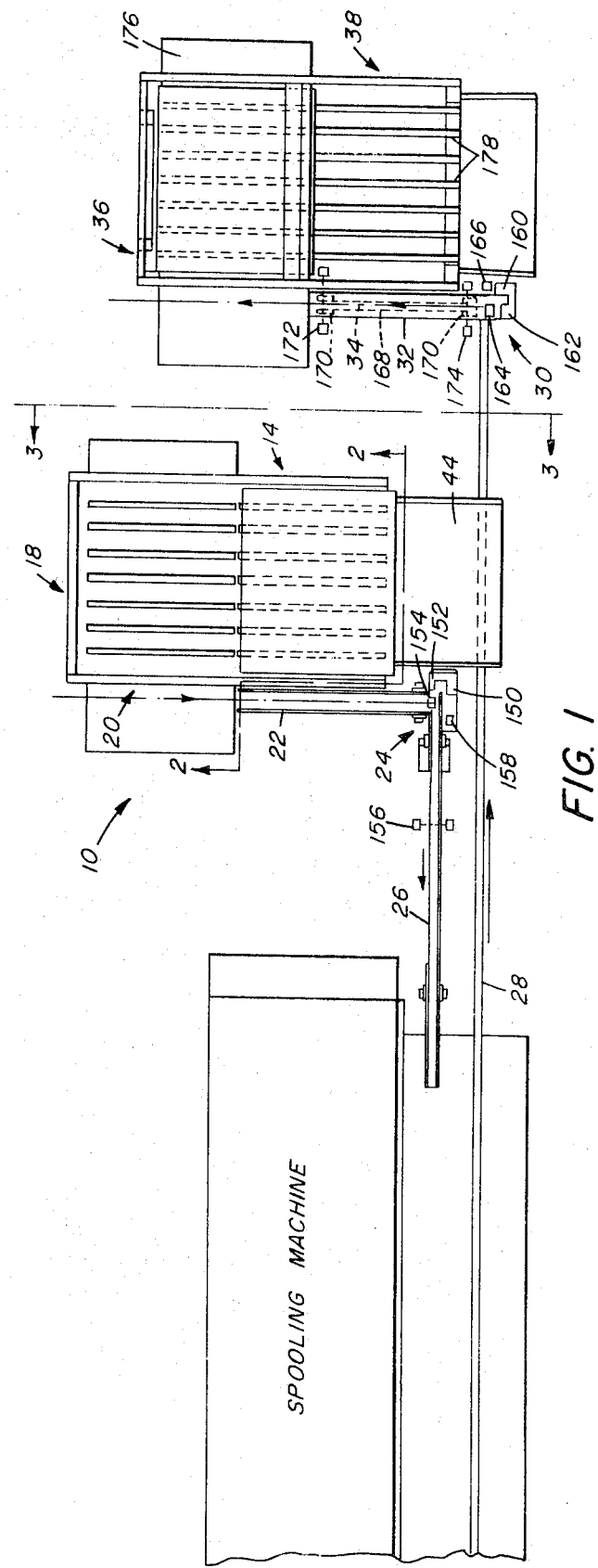
FIG. 1 is a top plan view of a cartridge handling system in which a preferred embodiment of the tray unloading mechanism of this invention is incorporated.

With reference to the drawings, FIG. 1 shows a cartridge handling system comprising an in-feed section indicated generally by the numeral 10 in which a plurality of rows of cartridges are automatically unloaded from a tray, converted into a single row, and fed one at a time in single file into a spooling machine where they are loaded, and an out-feed section indicated generally by the numeral 12 in which the single row of loaded cartridges from the spooling machine is converted into a plurality of rows and automatically loaded into empty trays. A preferred embodiment of a tray unloading mechanism of this invention indicated generally by the numeral 14 is incorporated in the in-feed section 10 for unloading multiple rows of empty cartridges 15 from a tray 16 (FIG. 2), and sweeping the rows of cartridges onto an in-feed indexing mechanism 18 located at a cartridge indexing station. The in-feed indexing mechanism 18 is indexed one step at a time for positioning each of the rows of empty cartridges 15 in succession at a row unloading station 20. A row unloading mechanism located at unloading station 20 unloads each row of cartridges 15 from indexing mechanism 18 onto a conveyor 22 that conveys them to a transfer station 24. A transfer mechanism at transfer station 24 transfers the cartridges 15 one at a time without changing their orientation in a direction at right angles to their original direction of motion onto an in-feed conveyor 26 which conveys the cartridges 15 one at a time to the spooling machine. At the spooling machine, the empty cartridges 15 are loaded with spools of film and deposited one at a time on an out-feed conveyor 28 for conveying the loaded cartridges 15 in a single row from the spooling machine to an out-feed transfer station 30. An out-feed transfer mechanism located at transfer station 30 transfers each of the cartridges 15 without changing its orientation in a direction at right angles to its original direction of movement onto an accumulating rail 32. After a predetermined number of cartridges 15 are accumulated on the rail, an out-feed cartridge transport mechanism 34 located above rail 32 transports the accumulated row of cartridges 15 onto an out-feed indexing mechanism 36 substantially identical to in-feed indexing mechanism 18. The out-feed indexing mechanism 36 indexes each row of cartridges 15 one step until a predetermined number of rows of cartridges are collected thereon equal to the number of compartments in an empty tray. An out-feed sweeping mechanism normally in register with out-feed indexing mechanism normally in register with out-feed indexing mechanism 36 sweeps the rows of cartridges 15 from the out-feed indexing mechanism onto a cartridge loading mechanism 38 at a tray loading station. The cartridge loading mechanism 38, which may be substantially identical to cartridge unloading mechanism 14, lowers the loaded cartridges 15 into the compartments of an empty tray 16. The operator removes the tray 16 of loaded cartridges 15 from the tray loading station and stacks them onto any suitable pallet or the like. All of the aforementioned mechanisms and conveyors are driven by any suitable drive means and operated in timed relation by any suitable electrical system comprising photocells, relays, switches, some of which may be controlled by photocells, and logic controls.

Figure 2:
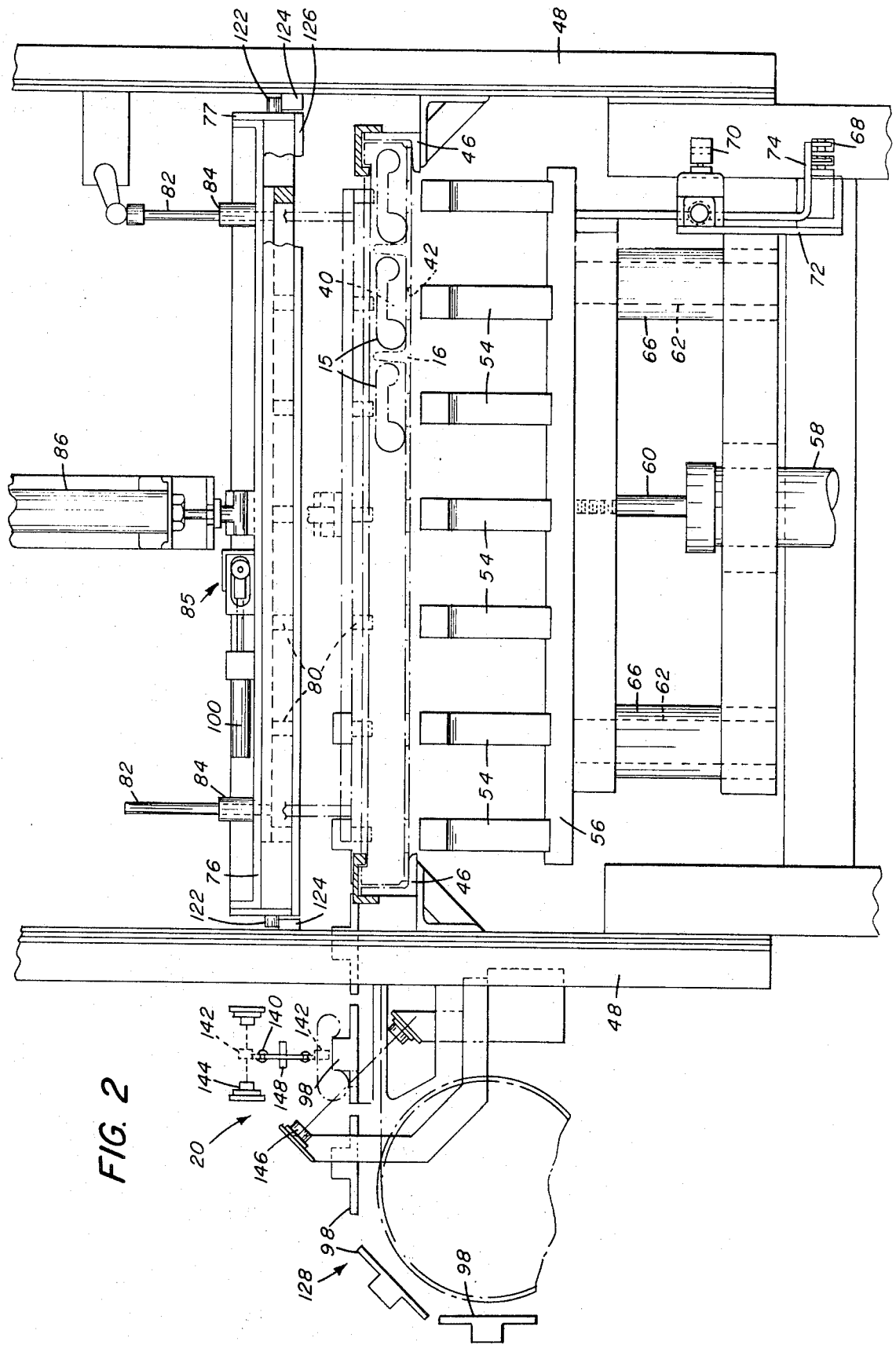
FIG. 2 is an enlarged front elevational view of the tray unloading mechanism taken substantially along line 2—2 of FIG. 1, and illustrating the unloading mechanism in its normal rest position.

The trays 16 filled with empty cartridges 15 are stacked on pallets, and the pallets placed near the in-feed section 10. The trays 16 may be of any known type, each comprising a rectangular frame having plurality of adjacent elongated compartments 40 for receiving multiple rows of empty cartridges 15 in side by side relation (FIG. 2). Each of the compartments 40 is provided with an elongated opening 42 in the bottom of the tray for a purpose to be explained hereinafter. The operator removes a tray 16 of empty cartridges 15 from the pallet, and manually places it on a shelf 44 (FIGS. 1 and 3) and slides the tray along shelf 44 onto guide rails 46 (FIG. 2) supported by rigid corner posts 48. One end of tray 16 engages an actuator arm, not shown, for closing an interlock switch in the electrical circuit when the tray is moved into an unloading position. When the operator then presses a suitably located start switch button, not shown, a solenoid operated fluid cylinder 50 (FIG. 2) is energized for moving a clamp 52 through suitable linkage into engagement with an end of tray 16 for releasably holding the tray in the unloading position.

Figure 3:
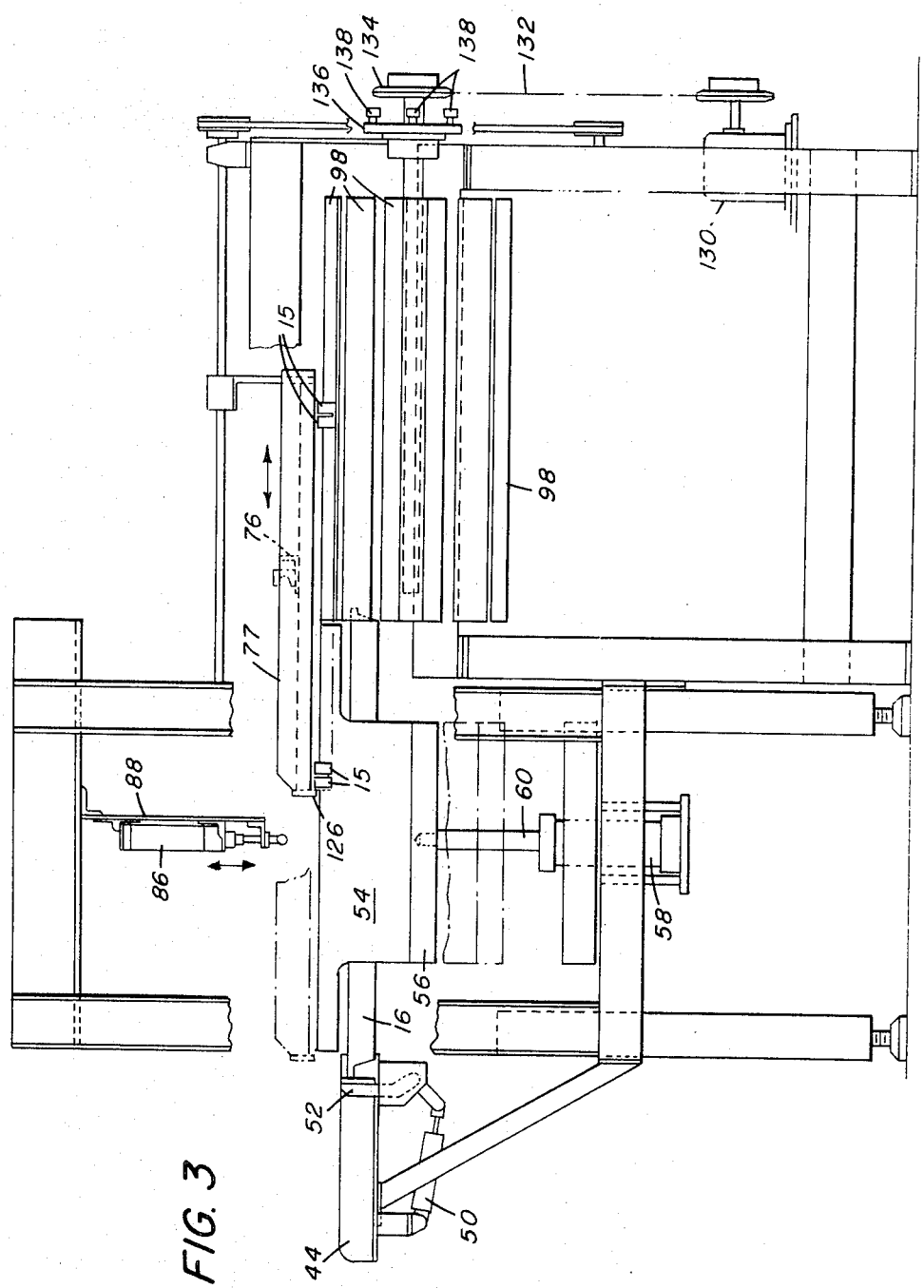
FIG. 3 is a side elevational view of the tray unloading mechanism taken substantially from line 3—3 of FIG. 1.

The tray unloading mechanism as best seen in FIGS. 2 and 3 comprises a plurality of parallel, spaced apart elevator bars 54 secured to a support plate 56 arranged at right angles thereto. The elevator bars 54 are reciprocably movable in a vertical direction from a normal rest or retracted position as seen in FIG. 2 to an elevated position as seen in FIG. 3 in which the elevator bars 54 pass through slotted openings 42 in the tray and lift the cartridges 15 above and clear of the tray. Reciprocal movement is imparted to elevator bars 54 by a solenoid operated fluid cylinder 58 secured to the frame and having cylinder rod 60 secured to plate 56. The elevator bars 54 are accurately guided for reciprocal movement by guide rods 62 secured to plate 56 and slidable within any suitable guide bores in spaced parallel plates 64 and sleeves 66 secured to the frame. The upper and lower end positions of elevator bars 54 are controlled by spaced apart limit switches 68, 70 (FIG. 2) on a bracket 72 secured to the frame for controlling the solenoid operated cylinder 58. The switches 68, 70 are actuatable by an L-shaped switch actuator 74 secured to plate 56.

Figure 4:
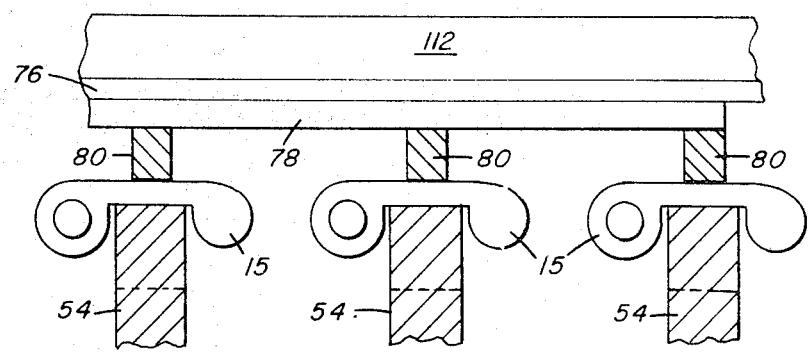
FIG. 4 is an enlarged segmental view of a portion of the unloading mechanism of FIG. 2 illustrating the position of the elevator bars during the cartridge lifting operation.
Figure 5:
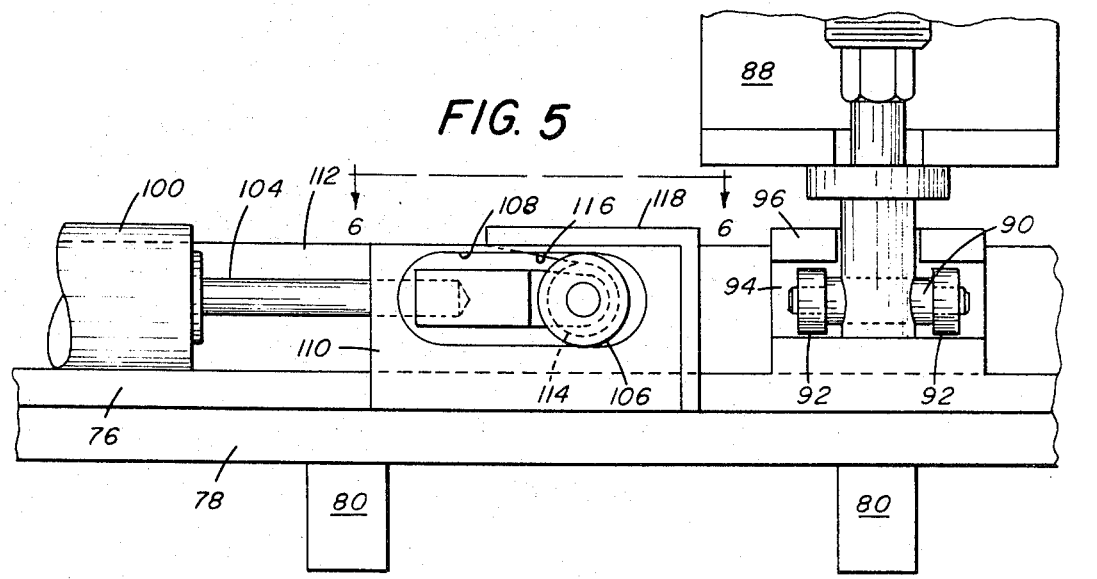
FIG. 5 is an enlarged segmental viw of a portion of the tray unloading mechanism of FIG. 2 illustrating the locking mechanism for releasably locking the retaining bars to the sweeping mechanism.
Figure 6:
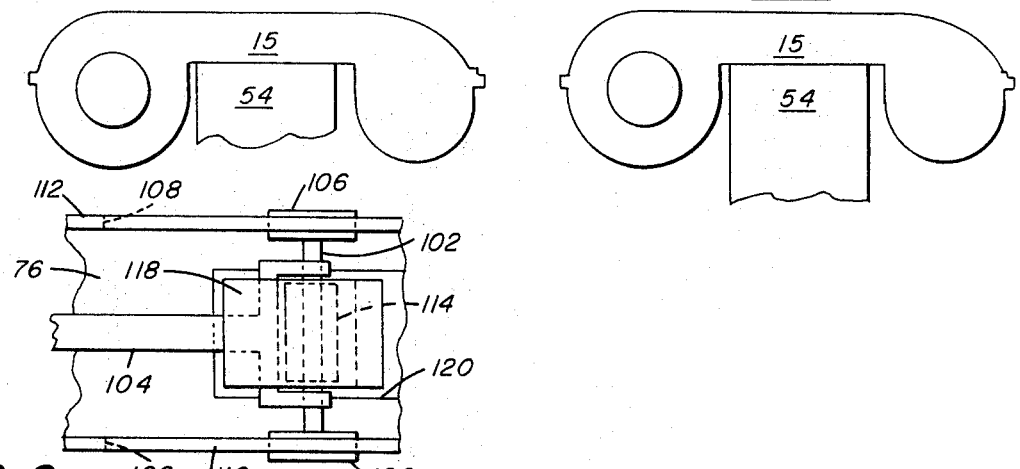
FIG. 6 is a segmental view of the locking mechanism of FIG. 5 looking at it from line 6—6 of FIG. 5.

A cartridge retaining mechanism as best seen in FIGS. 2, 4, and 5 is positioned above and in register with clamped tray 16 for retaining and positioning the cartridges 15 on elevator bars 54 during lifting movement of the bars to their elevated position. The retaining mechanism comprises a cross bar 76 mounted on a rectangular sweep frame 77. A mounting plate 78 is secured to cross bar 76 for vertical movement relative thereto and has a plurality of spaced, depending retaining bars 80 substantially in register with elevator bars 54. The mounting plate 78 and bars 80 are mounted for vertical reciprocal movement by guide rods 82 on plate 78 slidable within sleeves 84 secured to cross bar 76. The plate 78 and bars 80, when released by a lock 85, are movable downwardly by gravity, and the movement is controlled by any suitable damping cylinder 86 secured to a fixed frame member 88 and having a cross pin 90 (FIG. 5) at the end of the cylinder rod provided with rollers 92 nesting within a notch 94 in a bracket 96 secured to mounting plate 78. The lowermost position of retaining bars 80 is controlled by an adjustable stop, not shown, for limiting the downward travel to a point where the retaining bars are spaced only a short distance such as an eighth of an inch from the cartridges 15 as they lie in the tray 16 over the retracted elevator bars 54. However, when the elevator bars engage the cartridges they lift the latter into direct engagement with the retaining bars 80. Bars 80 thereby prevent cartridges 15 from tilting or canting on elevator bars 54 during the remainder of the lifting operation so that in their elevated position, cartridges 15 are precisely positioned on the bars for sweeping onto aligned T-bars 98 of the indexing mechanism to be explained hereinafter. When elevator bars 54 reach their elevated position, the aforementioned lock 85 is actuated to lock the plates 76, 78 together and, as described below, to lift retaining bars 80 clear of cartridges 15 to free them from pressure during the sweeping operation. This is accomplished by a solenoid operated fluid cylinder 100 (FIG. 5) of lock 85 on cross support 76 having a cross pin 102 mounted on a clevis at the end of cylinder rod 104 and journaled in guide rollers 106. Rollers 106 are movable within opposed slots 108, one in a bracket 110 secured to cross support 76 and the other in cross support wall 112. Pin 102 has a roller 114 between guide rollers 106 and movable within a camming groove 116 in a cam block 118 secured to plate 78 and extending through a slot 120 in plate 76 for lifting plate 78 and retaining bars 80 clear of the cartridges 15 upon outward operation of cylinder 100, and to lock plate 76, 78 together.

The sweeping mechanism (FIGS. 2 and 3) for sweeping the cartridges 15 from elevator bars 54 when in their elevated position comprises the aforementioned sweep frame 77 overlying the cartridges 15 and having rollers 122 on opposite sides thereof slidably engageable with two or more sides of a pair of guide rails 124 secured to the fixed support frame for slidably guiding the sweep frame for movement in a horizontal plane. The sweep frame 77 has a depending bar 126 (FIG. 2) on the front side thereof adapted upon slidable movement of the frame to engage the rows of cartridges 15 and to sweep them from elevator bars 54 onto the in-feed indexing mechanism 18 as seen in FIG. 3.

The in-feed indexing mechanism 18 as seen best in FIGS. 2 and 3 comprises an endless conveyor 128 formed from a plurality of the aforementioned indexing bars 98 of inverted T-shaped cross section. The T-bars 98 are spaced apart a predetermined pitch, and are positioned by any suitable detent mechanism with a bar 98 in alignment with each of the elevator bars 54 and cartridges 15 mounted thereon. The T-bar conveyor 128 is driven by any suitable motor 130 (FIG. 3) coupled by a driving chain 132 to a sprocket 134 mounted on one of the conveyor shafts. The indexing of the conveyor chain 128 one pitch at a time is controlled by the aforementioned detent mechanism which may comprise a circular indexing plate 136 (FIG. 3) secured to a conveyor shaft and having a plurality of equiangularly spaced rollers 138 secured to the plate engageable by a pivotally mounted dog (not shown) normally held in an engaged position and movable by any suitable means such as a solenoid operated fluid cylinder to a retracted position. Accordingly, when it is desired to index the T-bar conveyor 128, the detent dog is momentarily withdrawn releasing indexing plate 136 and conveyor 128. Simultaneously, the motor 130 is momentarily energized, stepping the conveyor 128 one pitch, at which time the dog is re-engaged stopping conveyor 128. When the T-bar conveyor has indexed a predetermined number of times exhausting the rows of cartridges thereon, a sequence switch, not shown, is actuated interrupting the control circuit for the conveyor and preventing further indexing of the T-bar conveyor until additional rows of cartridges are fed by sweep frame 77 onto the indexing conveyor.

The in-feed T-bar unloading mechanism (FIG. 2) may comprise an endless chain 140 arranged above a T-bar 98 in the upper reach of the indexing conveyor 128, and extending across the entire length of the T-bar. A pair of spaced pusher blocks 142 secured to chain 140 are each adapted upon rotation of the chain to move along the T-bar and push a row of cartridges 15 thereon onto conveyor 22 (FIG. 1) which conveys the cartridges to transfer station 24. When the entire row has been conveyed by one of the blocks 142, the other block actuates a photodetector 144 discontinuing further advance of chain 140. In addition, another light source and photodetector 146 located adjacent a T-bar 98 senses the absence of a cartridge at the end of the T-bar and in response thereto conditions the electrical circuit to advance the indexing conveyor 128 another pitch for advancing another row of cartridges to the unloading station. As soon as this occurs, the cartridge blocks off photodetector 144, and when the conveyor advance is stopped, energizes a drive motor, not shown, for pusher chain 140 for pushing the new row of cartridges onto conveyor 22. The chain 140 is arranged to be pivotally movable as a unit about chain sprocket shaft 148 to permit ready access to the chain and T-bars.

The conveyor 22 (FIG. 1) conveys the cartridges from the T-bar to the in-feed transfer station 24 (FIG. 1) where any suitable pusher mechanism 150 is located for pushing each of the cartridges in the same orientation but in a direction at right angles to conveyor 22 onto spooler conveyor 26 which conveys the cartridges in single file order to the spooling machine. The pusher mechanism 150 comprises any suitable pusher bar 152 which is reciprocably movable between a normal retracted position and an ejecting position in which it engages and ejects the leading cartridge 15 onto the spooler conveyor. The operation of pusher bar 152 is controlled by any suitable photodetectors, one photodetector 154 suitably located for sensing the leading cartridge at transfer station 24, another photodetector 156 suitably located adjacent spooler conveyor 26 for sensing the absence of a cartridge on the conveyor, and the third photodetector 158 suitably located for sensing the absence of the pusher bar mechanism. Accordingly, when a cartridge 15 is present at the in-feed transfer station 24 and no cartridge is sensed on spooler conveyor 26, the pusher bar 152 is actuated pushing the leading cartridge onto the spooler conveyor. As soon as pusher bar 152 has advanced to its ejecting position, the photodetector 158 is blocked by the pusher bar mechanism causing the pusher bar to be returned to its original or normal retracted position. In the event the spooler conveyor photodetector 156 is blocked for a predetermined time, such as 30 seconds, the logic system is actuated to provide a signal for de-energizing the drive motors for conveyors 22, 26 to prevent the conveyors from rubbing on the motionless cartridges thereon. The spooler conveyor 126 conveys the cartridges into the spooling machine where the cartridges are opened and loaded with film. The loaded cartridges from the spooling machine are deposited on out-feed spooler conveyor 28 which conveys the loaded cartridges in single file to out-feed transfer station 30 similar to the in-feed transfer station 24. A pusher mechanism 160 at the out-feed transfer station comprises a reciprocably movable pusher bar 162 similar to bar 152 for pushing the cartridges one at a time in the same orientation but at right angles to the out-feed spooler conveyor 26 onto an accumulator bar 32. The pusher bar 162 is controlled by a photodetector 164 for sensing the presence of a cartridge at the transfer station. If a cartridge 15 is present, pusher bar 162 is moved from its normal retracted position to its ejecting position. When the pusher mechanism 160 reaches the ejecting position, it blocks another photodetector 166 causing pusher bar 162 to be returned to its normal retracted position. Above accumulator bar 32, a pusher chain mechanism 34 is located, similar to the in-feed pusher mechanism, comprising a chain 168 and a pair of spaced pusher blocks 170. The out-feed pusher chain 168 is controlled by a photodetector system, and when a full row of cartridges 15 is pushed onto accumulator bar 32, the leading cartridge actuates a photodetector 172 which in combination with a photodetector 174 blocked by a pusher block 170 actuates the drive motor (not shown) for pusher chain 168. The pusher block 170 engages the row of cartridges and slides them from accumulator bars 32 onto a T-bar of the out-feed indexing mechanism 34 which is similar to the in-feed indexing mechanism 18. When the pusher block 170 has transferred the row of the cartridges from the accumulator bar, the other pusher block actuates photodetector 174 for de-energizing the pusher chain drive motor substantially precisely when the pusher chain reaches its normal rest position.

The out-feed indexing mechanism 34 (FIG. 1) is substantially identical to the in-feed indexing mechanism 18 comprising a T-bar conveyor 176 controlled by any suitable indexing plates, detents, relays, switches, etc, for indexing the conveyor one T-bar at a time. Such action occurs repetitively until a predetermined number of rows of cartridges 15 have been indexed onto the conveyor placing it in a loaded condition. Once the conveyor 176 is loaded, an out-feed sweep mechanism, not shown, similar to the in-feed sweep mechanism is actuated by the control mechanism for sweeping the rows of cartridges from indexing conveyor 176 to cartridge loading mechanism 38 substantially identical to the cartridge unloading mechanism 14 of the in-feed section.

While the T-bars of conveyor 176 are being loaded, the operator inserts an empty tray 16 on the out-feed platform in proper position for loading. The operator pushes any suitable start button energizing a clamp solenoid for clamping the tray in the loading position. At the same time, suitable circuitry is energized causing elevator bars 178 similar to bars 54 to be lifted to their elevated position in which they remain. When the T-bar conveyor 176 is fully loaded, the timing cam, not shown, actuates any suitable switch for inhibiting further operation of pusher chain 168 until the rows of cartridges on conveyor 176 are transferred onto elevator bars 178. In addition, the sweeping mechanism drive motor, not shown, is energized and the sweeping mechanism is moved from its normal retracted position to its end of sweep position causing a pusher bar at one end thereo to push the rows of cartridges onto elevator bars 178. When the sweeping mechanism reaches its end of sweep position, the sweep motor is deenergized and the solenoid operated cylinder is energized moving elevator bars 178 to their normal retracted position, lowering the loaded cartridges into empty tray 16. The loaded tray is unclamped and manually removed by the operator and placed on a pallet or the like. Movement of elevator bars 178 to their normal retracted position conditions the circuit to return the sweeping mechanism to its normal retracted position, to actuate the row loading mechanism to load the T-bars, and to index the T-bar conveyor 176 one increment or T-bar at a time until it is fully loaded.

The invention has been described in detail with particular reference to a preferred embodiment thereof, but it will be understood that variations and modifications can be effected within the spirit and scope of the invention described hereinabove.

I claim:

1. In a mechanism for unloading articles from a compartmented tray having elongated openings in the bottom of each compartment, the combination comprising:

means for supporting the tray containing articles;
elevating means comprising bars movable upwardly through the openings in the tray for engaging the bottoms of the articles and lifting the articles clear of the tray; and
free floating retaining means movable adjacent to the tops of the articles and engageable thereby for retaining the articles on said bars as the articles are lifted by said bars;
and means for moving the articles along said bars while they are retained by said retaining means for discharge therefrom.

2. The invention according to claim 1 wherein said retaining means comprises a plurality of retaining bars positioned above and in register with said elevating bars.

3. The invention according to claim 1 wherein said retaining means is releasably latched in a retracted position above the articles, and, when released, falls under the influence of gravity to a retaining position adjacent the tops of the articles.

4. In a mechanism for unloading inverted generally U-shaped cartridges stacked in rows in the compartments of a tray having elongated openings in the bottom of each compartment, the combination comprising:

means for supporting the tray containing cartridges;

elevating means comprising first bars movable upwardly through the openings in the tray for engaging the bottoms of the cartridges and lifting them clear of the tray; and retaining means comprising second bars positioned above and in register with the rows of cartridges; and lock means for releasably locking said second bars in a retracted position spaced above the cartridges, said second bars adapted, when released by said lock means, to fall under the influence of gravity to a retaining position in which said second bars are adjacent the tops of the articles.

5. The invention according to claim 4 wherein said second bars are moved to said retaining position at substantially the same time that said first bars engage the bottoms of the cartridges.

6. The invention according to claim 4 wherein said retaining means further comprises means for damping the fall of said second bars to said retaining position.

7. In a mechanism for unloading inverted generally U-shaped cartridges arranged in rows in the compartments of a tray having elongated openings in the bottom of each compartment, and sweeping the rows of unloaded cartridges onto a cartridge receiving means, the combination comprising:

means for supporting the tray containing cartridges;

elevating means comprising bars movable upwardly through the openings in the tray for engaging the bottoms of the cartridges and lifting them clear of the tray to an elevated position;

retaining means positioned above the rows of cartridges and movable between a retracted position spaced above the cartridges in the tray and a retaining position adjacent the tops of the cartridges;

cartridge receiving means having a receiving surface in alignment with the top surface of said bars in said elevated position; and sweeping means having a normal rest position above and in register with the tray, and movable to an end-of-sweep position for sweeping the cartridges from said bars in their elevated position onto said receiving surface.

8. The invention according to claim 7, and further comprising lock means for releasably locking said retaining means, in its retracted position, to said sweeping means, said retaining means adapted when released by said lock means to fall under the influence of gravity to said retaining position.

9. The invention according to claim 7 wherein said retaining means further comprises means for damping the fall of said retaining means to said retaining position.

10. The invention according to claim 7 wherein said lock means has a cam adapted when said lock means is locked for raising said retaining means out of engagement with the tops of the cartridges on the bars in their elevated position.

11. The invention according to claim 7 wherein said retaining means comprises a plurality of retaining bars positioned above and in register with said elevating bars.

* * * * *